(12) United States Patent
Dickinson (10) Patent No.: US 10,066,179 B2
(45) Date of Patent: Sep. 4, 2018

(54) HIGH ENERGY CONTENT DENSIFIED LIGNOCELLULOSE BIOMASS

(71) Applicant: Integro Earth Fuels, Inc., Arden, NC (US)

(72) Inventor: Walt Dickinson, Arden, NC (US)

(73) Assignee: Integro Earth Fuels, Inc., Arden, NC (US)

( * ) Notice: Subject to any disclaimer, the term of this patent is extended or adjusted under 35 U.S.C. 154(b) by 0 days.

(21) Appl. No.: 15/048,122

(22) Filed: Feb. 19, 2016

(65) Prior Publication Data

US 2016/0244686 A1 Aug. 25, 2016

Related U.S. Application Data (60) Provisional application No. 62/118,788, filed on Feb. 20, 2015.

(51) Int. Cl.
| | | |
|---|---|---|
| C10L 9/08 | (2006.01) | |
| C10L 5/30 | (2006.01) | |
| C10L 9/10 | (2006.01) | |
| C10L 5/44 | (2006.01) | |

(52) U.S. Cl.
CPC ............... *C10L 9/083* (2013.01); *C10L 5/30* (2013.01); *C10L 5/442* (2013.01); *C10L 9/10* (2013.01); *C10L 2200/0469* (2013.01); *C10L 2290/02* (2013.01); *C10L 2290/28* (2013.01); *C10L 2290/30* (2013.01); *Y02E 50/10* (2013.01); *Y02E 50/15* (2013.01); *Y02E 50/30* (2013.01)

(58) Field of Classification Search
CPC combination set(s) only.
See application file for complete search history.

(56) References Cited

U.S. PATENT DOCUMENTS

| | | | |
|---|---|---|---|
| 363,056 A | 5/1887 | Fordred | |
| 2,247,207 A | 6/1941 | Schorger | |
| 3,645,939 A * | 2/1972 | Gaylord | B32B 27/00 524/13 |
| 4,553,978 A | 11/1985 | Yvan | |
| 4,787,917 A | 11/1988 | Leclerc de Bussy | |
| 4,816,572 A | 3/1989 | Bourgeois | |
| 5,711,768 A * | 1/1998 | Schulz | C02F 11/12 44/552 |
| 2010/0251616 A1* | 10/2010 | Paoluccio | C10B 49/14 48/197 R |
| 2011/0041392 A1* | 2/2011 | Stromberg | C10L 5/363 44/607 |
| 2011/0252698 A1* | 10/2011 | Camper | C10L 5/442 44/605 |

(Continued)

*Primary Examiner* — Ellen McAvoy
*Assistant Examiner* — Chantel Graham
(74) *Attorney, Agent, or Firm* — Dority & Manning, P.A.

(57) ABSTRACT

Methods and systems for forming densified lignocellulose biomass are described. Methods can include torrefaction and densification of a lignocellulose feedstock. Temperature and pressure control and lubricant addition throughout the process can provide for the lignin to dissipate more completely throughout the biomass and better coat the cellulose. The product can include a high level of lignin and low volatiles, both of which can improve the energy density of the product. In addition, the process can include a cooling step that can increase the crystallinity of the solidified lignin, which can further increase bulk density and improve grindability of the product.

11 Claims, 3 Drawing Sheets

(56) References Cited

U.S. PATENT DOCUMENTS

| | | | | |
|---|---|---|---|---|
| 2011/0314728 A1* | 12/2011 | Camper | .................... | C10L 5/04 |
| | | | | 44/606 |
| 2013/0244293 A1* | 9/2013 | Balan | ....................... | C07G 1/00 |
| | | | | 435/99 |
| 2014/0343333 A1* | 11/2014 | Ginestra | ................ | C10G 1/002 |
| | | | | 585/14 |
| 2016/0122786 A1* | 5/2016 | Lin | ......................... | C12N 1/20 |
| | | | | 435/134 |

\* cited by examiner

HIGH ENERGY CONTENT DENSIFIED LIGNOCELLULOSE BIOMASS

CROSS REFERENCE TO RELATED APPLICATION

This application claims filing benefit of U.S. Provisional Patent Application Ser. No. 62/118,788 having a filing date of Feb. 20, 2015, which is incorporated herein by reference in its entirety.

BACKGROUND

As concerns for the environmental costs related to the use of non-renewable resources grow, energy production based on alternative resources such as solar, wind, and biomass is being developed. Unfortunately, the relative ease of energy production and the high energy density available in non-renewable resources is difficult to match. For instance, solar power requires large surface area collectors and wind power requires large wind turbines. In addition, both of these routes require energy storage systems, which add additional energy conversion steps and associated efficiency losses.

Use of biomass to replace nonrenewable energy sources has shown great promise, such as in the formation of biofuels and industrially useful bioplastics. The relatively low energy density of biomass as compared to fossil fuels such as coal and natural gas remains a problem for large-scale, high energy intensity use of biomass, for instance as an energy source for power plants.

Lignocellulosic biomass is a most readily available renewable natural resource and provides the two most abundant organic compounds on earth in lignin and cellulose, with the other major components including hemicellulose. The usefulness of cellulose has long been recognized, primarily in paper making, but increasingly for use in formation of biofuels due to the high energy density. Lignin is a generic term for a complex polymer of aromatic alcohols that varies somewhat between plant species, but in all forms has a very high energy density. It is an integral part of the cell wall that covers and protects the cellulose and hemicellulose with such efficiency that it also presents many challenges to the successful use of the biomass.

Attempts have been made to utilize lignocellulose biomass in energy production through torrefaction and densification. Torrefaction is a mild form of pyrolysis at relatively low temperature in a low oxygen atmosphere that increases the energy density of a lignocellulose biomass. During torrefaction, water may evaporate and volatile organic compounds may decompose and gassify, resulting in a loss of mass and chemical energy in the gas phase. However, because more mass than energy is lost, torrefaction results in energy densification, yielding a torrefied product with lower moisture content and higher energy content compared to untreated biomass. To further increase the energy density, torrefied biomass has been compacted to a highly dense form.

Unfortunately, torrefied and densified biomass formed to date has fallen short of the energy density and bulk density necessary for use as a high energy fossil fuel replacement. For instance, while the densified products have shown increase in energy density as compared to the starting materials (though not equal to fossil fuels), they still cannot be handled during shipping, storage, and use without excessive breakdown and fines formation. In addition, they cannot be ground in a ball mill to a size suitable for use, e.g., in coal-fired boilers. Moreover, the densified materials maintain a high level of volatile organic compounds, and release volatiles at relatively low temperatures above about 90° C.

What are needed in the art are methods and systems that can be utilized to form a high energy density and high bulk density biomass. The high energy and bulk density biomass can be beneficially utilized as a replacement for fossil fuel based energy sources such as coal.

SUMMARY

According to one embodiment, a method for forming a dense lignocellulose biomass is described. For instance a method can include torrefying a lignocellulosic biomass such as wood chips, ground harvest waste, etc. The method can also include conveying the torrefied lignocellulose biomass to a compression die. The torrefied lignocellulose biomass can be low in moisture at the compression die, for instance containing about 3 w/v % steam or less at the entrance to the compression die. The lignocellulose biomass can then be densified and extruded from the compression die.

Following the compression, the lignocellulose can be maintained at high temperature and pressure conditions for a period. For instance, the lignocellulose biomass can be conveyed through a sequential series of extension dies that are immediately downstream of the compression die. The densified lignocellulose biomass can be held at an increased pressure and temperature through the extension dies. For example, the densified biomass can be held at a temperature of about 200° C. or greater and at a pressure of about 10 tons per square inch to about 30 tons per square inch for a period of time following compression, e.g., as it passes through the extension dies. In one embodiment, water can be added to the compression dies in conjunction with the densified biomass, which can improve lubrication of the densified lignocellulose biomass.

The densified lignocellulose can thereafter be cooled to a temperature that is below the glass transition temperature of the lignin in the biomass while still held at an increased pressure. For instance, the densified lignocellulose biomass can be cooled under pressure to a temperature of about 135° C. or less.

Also disclosed are systems for forming a densified lignocellulose biomass. A system can include, for example, a torrefaction reactor, a compression die, a series of extension dies (i.e., two or more extension dies), and a series of couplings that couple the extension dies to one another. Each coupling can be in fluid communication with a water source and can include two or more inlets such that water from the water source can be delivered to the inner diameter of the couplings. Thus, during use, water can be delivered to the densified lignocellulose biomass as it passes through the extension dies and the couplings.

A system can include additional components as well, such as a cooling section downstream of the extension dies, a grinder downstream of the torrefaction reactor and/or a blender downstream of the torrefaction reactor.

A densified lignocellulose biomass as may be formed by the disclosed methods and systems is also disclosed. The densified lignocellulose biomass can have excellent characteristics for use as an energy source. For instance, the densified lignocellulose biomass can have a Hardgrove Grindability Index (HGI) of about 50° H or greater. The densified lignocellulose biomass can have a high bulk density and can be quite durable with little breakage or fines formation during shipping, storage, and handling. For instance, the densified lignocellulose biomass can have a bulk density of about 830 kilograms per cubic meter (kg/m$^3$) or more. The densified lignocellulose biomass can also have a high heat content, for instance about 20 megajoules per kilogram (MJ/kg) or greater.

BRIEF DESCRIPTION OF THE FIGURES

The present disclosure may be better understood with reference to the following figures.

DETAILED DESCRIPTION

It is to be understood by one of ordinary skill in the art that the present discussion is a description of exemplary embodiments only, and is not intended as limiting the broader aspects of the present invention.

The present disclosure is generally directed to methods and systems for forming a densified lignocellulose biomass and the densified biomass as may be formed thereby. Without wishing to be bound to any particular theory, it is believed that the processes provide a route to improved blending of the lignin throughout the biomass as well as decreased level of volatiles in the densified biomass, leading to increased bulk density as well as increased energy density in the densified product. Through temperature and pressure control, as well as improved lubricity of the torrefied biomass, it is believed that the chains forming the cellulose microfibrils can separate and the lignin can attain a viscosity such that the lignin can dissipate more completely throughout the biomass and better coat the cellulose. The processing conditions can also limit the amount of volatilization of the lignin throughout the process, which can maintain a higher level of lignin in the final product and decrease volatiles in the product, both of which can improve the energy density of the product. In addition, the process can include a cooling step that can increase the crystallinity of the solidified lignin, which can further increase bulk density and improve grindability of the product.

The high bulk and energy density lignocellulose product can have energy content and grindability characteristics similar to or better than coals. For instance, the densified product can exhibit characteristics similar to or better than low grade bituminous coal. As such, the densified product can be co-fired with coal or used as a complete replacement for coal in energy production, for instance in a boiler for heat or electricity production. For example, the densified product can be utilized in production of electricity, steel, cement, coke, combined heat and power facilities, syngas production, or any other industrial production applications that utilize high energy heat production such as coal or natural gas fired boilers.

Beneficially, the densified product can be handled using existing industry equipment as commonly found in coal-fired facilities. For instance, it can be ground by use of a standard ball mill. In addition, due to the high heat content of the materials, the densified product can be utilized as is without derating of pre-existing boilers in existing facilities.

Figure 1:
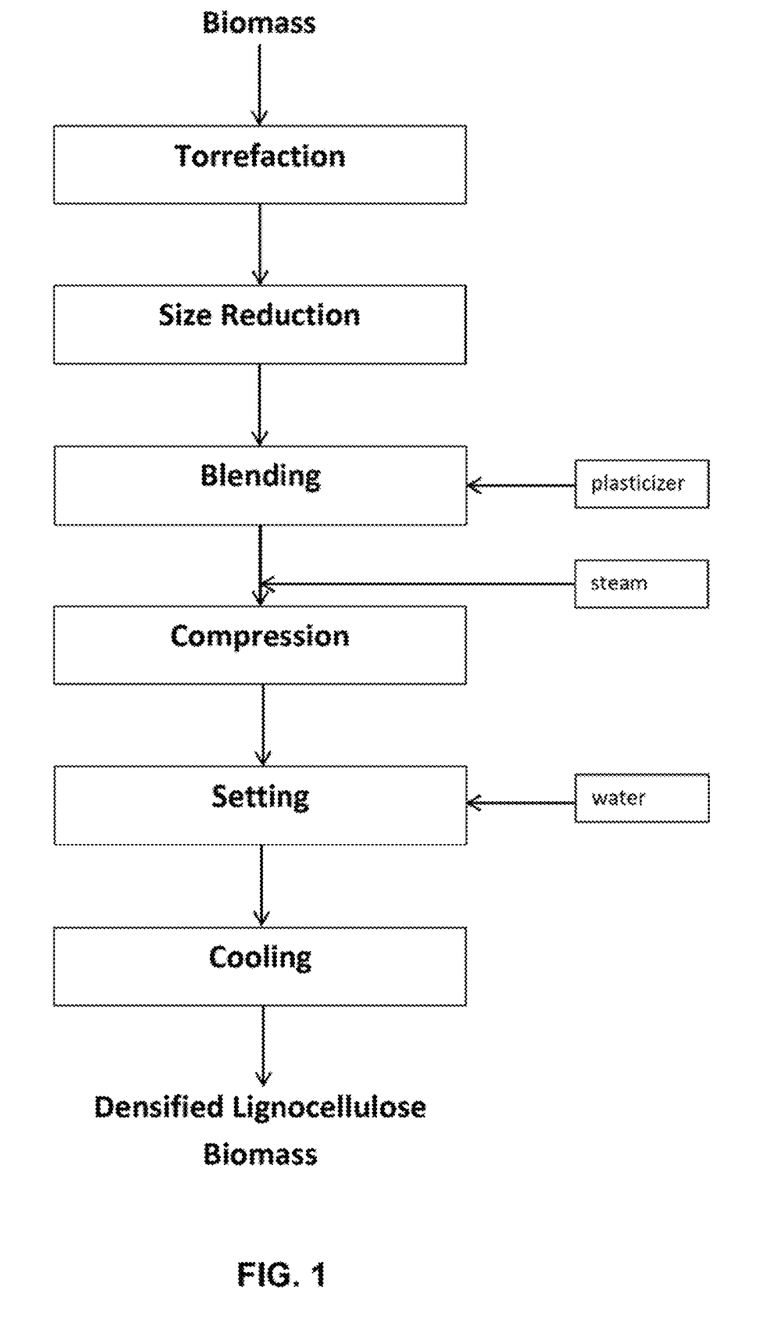
FIG. 1 presents a flow diagram for a process as disclosed herein.

FIG. 1 presents a flow diagram of one embodiment of a production process. As shown, the lignocellulose biomass feed is initially torrefied. The biomass feed to the process can be any lignocellulose biomass. Non-limiting examples of lignocellulose feedstock can include paper waste, wood, wood wastes and residues, particle board, sawdust, agricultural waste and crop residues, sewage, silage, grasses, rice hulls, bagasse, cotton, jute, hemp, flax, bamboo, sisal, abaca, straw, corn cobs, corn stover, switchgrass, alfalfa, hay, rice hulls, coconut hair, cotton, seaweed, algae, municipal waste, industrial lignocellulose waste, or mixtures of materials. In one embodiment, the lignocellulose biomass feedstock can be a relatively high energy density material, such as oak or aspen-based materials, or high energy density grasses.

In general, the feedstock can be chopped, ground, sheared or otherwise reduced in size as necessary prior to torrefaction. Typical size reduction processing as is known in the art can be carried out, as necessary. For example, grinding or chipping can be carried out by a commercially-available wood hog, wood grinder, wood chipper, or other similar apparatus that may receive collected biomass as an input and produce as output chips (e.g., wood chips) of a desired size as feedstock for the torrefier.

In one embodiment, the feedstock to the torrefier can have a maximum dimension of about 3 inches or less, for instance from about 1 to about 2 inches. Size reduction can be carried out at any point prior to torrefaction. For example, grinding, chipping, or shearing can be carried out in the field in one embodiment, as this may increase the volume of biomass that may be transported from a harvest site by a truck, trailer, or other vehicle.

In some embodiments, following initial size reduction, the particles may be subject to screening and optionally additional pretreatment as necessary. Screening may be performed by one or more screening systems and/or other similar devices capable of segregating particles by size, weight, shape and/or other physical characteristics. Screening, if utilized, may segregate biomass particles unsuitable for torrefaction and remove undesirable material (e.g., dirt, sand, etc.) or foreign objects (e.g., rocks, tramp metal, etc.).

Upon screening, particles determined to be oversized for the torrefaction and densification process can be further treated by, e.g., grinding and/or milling and then rescreened for either additional size reduction or for use as feedstock to the torrefier. Particles that remain oversized and/or are rejected for other reasons can be utilized to produce heat for the torrefaction process.

Particles may also be deemed too small for suitable processing. For instance, overly small particulates may be difficult to convey and may form dust. Rejects (whether too small, too large, or for some other reason) may be conveyed to a furnace as fuel. Following sorting, surge bins may be used to hold particles suited to be used as feedstock for torrefaction and/or to hold particles to be used as solid fuel.

The feedstock to the torrefier can be preheated and/or dried or not, as desired. For instance, in one embodiment, the feedstock can be initially dried through a low heat process and then either fed directly to the torrefier or alternatively allowed to return to ambient temperature prior to feeding to the torrefier. Alternatively, the feedstock can be fed directly to the torrefier at ambient temperature and humidity.

Within the torrefier, a gentle approach can be used to move and stir the feedstock so as to avoid excessive agitation. By avoidance of excessive agitation, downstream grinding of the torrefied can be improved and loss of particulates in the gas flow of the torrefier can be prevented.

The feedstock to the torrefier can be initially heated to a temperature of from about 230° C. to about 270°, for instance from about 240° C. to about 265° C., and it can remain in this temperature range throughout the torrefaction of the materials.

While the torrefaction reactor is not particularly limited, in one embodiment, a multi-tray torrefaction reactor can be used. One example, of a multi-tray torrefaction reactor is described in U.S. Published Patent Application No. 2013/0098751 to Ever, et al., which is incorporated herein by reference.

Briefly, a multi-tray torrefier can include a series of vertically stacked trays for torrefying the feedstock by use of an oxygen deprived hot gas under pressure. The stacked trays provide what amounts to a moving bed for the biomass that can be arranged in a relatively compact vertical reactor vessel. The oxygen deprived pressurized gas may be circulated through the vessel and through pressurized conduits that reheat the gas.

The vessel can uniformly heat through each tray such that the feedstock being torrefied is uniformly heated at each elevation in the vessel. To achieve uniform heating of the material on each tray the flow of oxygen deprived gas through the bed of material on each tray can be about 15 cubic meters per minute ($m^3$/min) or less, for instance from about 5 $m^3$/min to about 15 $m^3$/min or from about 5.6 $m^3$/min to about 14.2 $m^3$/min in some embodiments.

The torrefaction may be carried out in a substantially oxygen-deprived environment (e.g., oxygen content at or below approximately 2% in some embodiments). For instance, the oxygen deprived gas that may be fed through the torrefier can include, without limitation, superheated steam, nitrogen and other non-oxygen gases, or oxygen lean gases suitable for the purpose of this invention.

The flow of the oxygen deprived gas through each of the trays may be continuous. The gas is a heat transfer media that may add or remove heat from the material undergoing torrefaction. The continuous flow of oxygen deprived gas through the material in the tray heats the material, provided that the gas is at a higher temperature than the material. The constant flow of gas may also cool the material where the torrefaction reaction, which is exothermic, causes the material to become hotter than the gas. If the material overheats, the torrefaction reaction may over-react. Accordingly, the continuous flow of gas can regulate the temperature of the material in each tray to be about the same temperature as the gas.

The biomass material may have a total retention period for all of the trays in the reactor vessel of from about 15 to about 60 minutes, though the retention time can be longer or shorter in other embodiments. The retention period in the torrifier vessel may be selected based on the material processed in the vessel.

Each tray may include an opening through which biomass material falls to the tray at the next lower elevation in the vessel. The biomass material falls through the opening after traveling around the vessel and on the tray. A scraper may slide the material over the tray toward the opening. The rotational speed of the scraper can be selected to provide the desired retention period on each tray. The retention period may be uniform for each of the trays in the vessel or may differ. The retention period may be selected based on the number of trays performing each of drying, torrefaction and cooling (optionally) of the biomass, and the period required to perform each of these processes.

The trays may be solid, mesh, screen or include perforations or slots such that the gas can pass through the biomass and the trays. A scraper device may rotate to move the biomass material across the tray in an arch-shaped path. Alternatively, the trays may rotate while the scraper device and biomass do not rotate about the vessel.

The torrefaction can be carried out at atmospheric pressure or at increased pressure. For instance, the oxygen deprived gas can be injected into the vessel under a pressure of from about 3 to about 20 bar absolute. In addition, the biomass may be pressurized before being fed to the torrefier with a pressure transfer device.

The gas may be injected into the vessel at multiple elevations. For instance, the gas injected at a lower elevation can be hotter than the gas injected at a higher elevation. At an elevation of the vessel below from which the gas is extracted, the biomass may continue to cascade down through the trays.

The extracted gas can carry volatiles from the feedstock as well as steam. The extracted gas can thus exhibit an increased energy content that can be utilized, for instance in providing heat to the process. For instance, the gas from the torrifier can be circulated to a furnace to, e.g., initially heat the feedstock to the torrefier, heat the low oxygen content gas provided to the torrefier, or provide heat at other points within the process.

Upon leaving the torrefier (generally by an airlock), the torrefied biomass can be cooled, for instance to a temperature of from about 140° C. to about 200° C., or from about 145° C. to about 195° C. Cooling can be carried out, for instance, in a conveyor (e.g., a screw conveyor) that carries the biomass from the torrefier. While the temperature of the biomass can be cooled to less than about 145° C. after exiting the torrefaction reactor, in this case it should be reheated prior to other operations including size reduction, blending and/or densification such the biomass is at a temperature above the glass transition temperature of the lignin during downstream operations, e.g., from about 145° C. to about 200° C. Alternatively, the biomass can be held at a temperature above the glass transition temperature of the lignin throughout the process. For instance, should the biomass be held in a storage bin between individual operations such as size reduction and/or blending, the biomass can be held at an increased temperature during this storage, and in particular, at a temperature above the glass transition temperature of the lignin.

Referring again to FIG. 1, in one embodiment the torrefied biomass can be further reduced in size. For instance, the torrefied biomass can be ground or milled to generate particles of the torrefied biomass having a maximum dimension of about 2 inches or less, or about 2.5 inches (about 60 millimeters) or less in some embodiments. For instance, the torrefied biomass particles can be size reduced such that a majority of the materials have a maximum dimension of from about 1 millimeter or less, for instance from about 425 micrometers to about 850 micrometers in some embodiments. In addition, following size reduction, the torrefied biomass particles can have an aspect ratio of about 4 or less, or about 3 or less in some embodiments.

Size reduction of the torrefied biomass can be carried out according to a relatively gentle process such as by use of a roller mill or a hammer mill, which can break up the fibrous structure of the lignocellulose materials and provide improved access of the lignin throughout the cellulose and hemicellulose of the biomass. This is also believed to improve grindability of the final product.

In general, size reduction can be carried out with the torrefied biomass at a temperature above the glass transition temperature of the lignin, for instance at a temperature of from about 140° C. to about 200° C., or from about 145° C.

to about 195° C., which can improve distribution of the lignin throughout the biomass.

Prior to densification, the torrefied biomass can be blended with a plasticizer. In the illustrated embodiment, blending can be carried out following size reduction so as to improve incorporation of the plasticizer throughout the biomass. Blending can generally take place in an inert atmosphere, for instance in a low oxygen atmosphere as described above for the torrefaction step.

The plasticizer can be steam provided to the torrefied biomass at a temperature that is the same or near that of the biomass, for instance from about 145° C. to about 195° C. Steam may be preferred in some embodiments for use as the sole plasticizer as it is relatively inexpensive and easy to handle. However, the plasticizer is not limited to steam and other plasticizers may be alternatively utilized or may be used in conjunction with steam. By way of example, plasticizer such as tall oil pitch, rosin, fatty acid, vegetable oils (e.g., soy on), animal oils, corn protein, and mixtures of plasticizers can be utilized.

The amount of plasticizer added to the torrefied biomass can generally be about 5 wt./v % or less of the biomass, for instance about 3 wt./v % or less or from about 1 wt./v % to about 3 wt./v % in some embodiments. The plasticizer can be blended with the torrefied biomass for a period of time to encourage incorporation of the plasticizer throughout the biomass. For instance, the biomass and the plasticizer can be blended for a period of about 30 minutes or less, about 15 minutes or less or about 10 minutes or less in an oxygen deprived atmosphere at a temperature of from about 140° C. to about 200° C.

Following torrefaction, size reduction, and plasticizer blending, the torrefied biomass can be densified. The densification process can be a multi-stage process that includes compression, setting, and cooling, as shown in FIG. 1.

Figure 2:
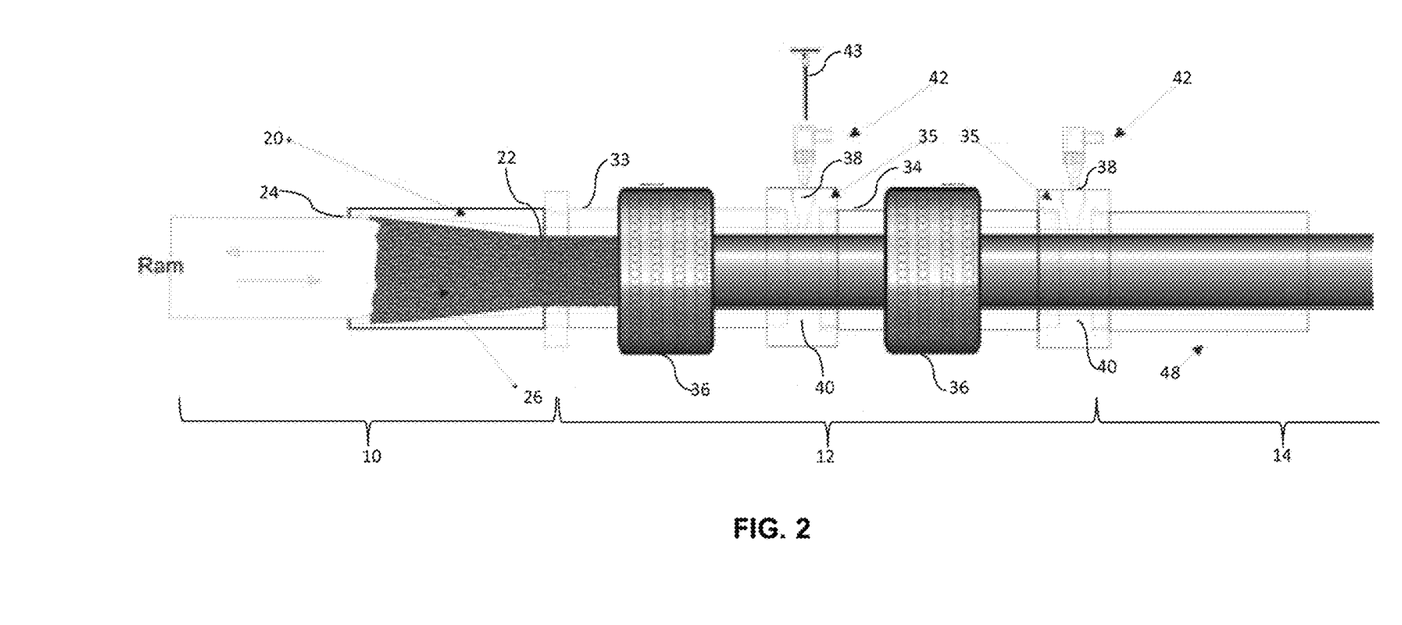
FIG. 2 illustrates a densification process of one embodiment of a system as disclosed herein.

FIG. 2 schematically illustrates a densification process including a compression stage 10, a setting stage 12, and a cooling stage 14. According to the process, the torrefied biomass can be heated and optionally combined with a lubricating flow aid upstream of the compression stage. For instance, the torrefied biomass can flow into a heat traced or jacketed horizontal screw just above the compression stage 10.

As illustrated on FIG. 1, the lubricant can be steam that can be injected into the torrefied biomass just upstream of the compression stage. For example, steam at a temperature approximately equal to the temperature of the torrefied biomass (i.e., from about 140° C. to about 200° C.) can be injected into the torrefied biomass just upstream of the compression stage 10.

Temperature of the torrefied biomass can be maintained at the elevated temperature in the feed and compression area. Upon entry of the torrefied biomass, there can be steam in the material in an amount of about 5 wt./v % or less, for instance from about 1% to about 3% wt./v %. As such, the system can include steam insertion capabilities in the conveyor and/or other pre-compression area. In general, the lubricant can be injected as late in the process as possible prior to compaction, e.g., just upstream of the entry to a compression ram.

The compression stage 10 can include any suitable compression die such as, for example, and without limitation, a briquetter or a ram press. The compression stage can include a series of conical dies that, upon application of pressure can densify and compact the torrefied biomass 26. For example, a compression die 20 can be a compression die having an exit diameter 22 that is about 10% smaller than the entry diameter 24. The length of the die can be, for example, from about 100 mm to about 300 mm, and the die inner diameter at the exit can be in one embodiment about 60 mm or greater.

The pressure applied to compact and densify the torrefied biomass can be, for example, from about 10 tons per square inch to about 30 tons per square inch. In addition, the compression die 20 can be heated, for instance to a temperature of from about 165° C. to about 220° C., or even higher in some embodiments, during the densification in the compression stage 10. For instance, the torrefied biomass can be heated to a temperature of about 200° C. during the compression stage 10.

A setting stage 12 can be downstream of the compression stage 10. The setting stage 12 can include a series of extension dies 33, 34 in series with one another. Though illustrated with two extension dies 33, 34, it should be understood that additional extension dies may be utilized. The extension dies can have an opening and exit of the same diameter (i.e., no further compaction of the biomass during the setting stage) and a length of e.g., about 100 mm to about 400 mm.

Figure 3:
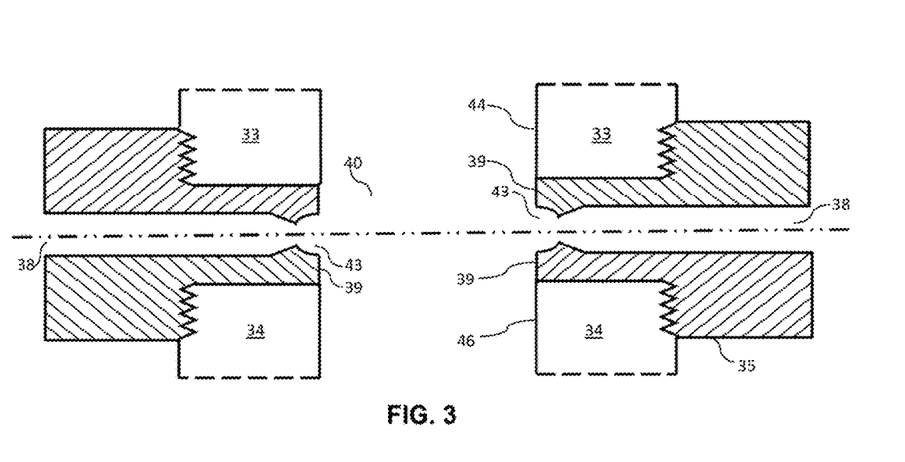
FIG. 3 illustrates a cross sectional view of a coupling as may be utilized in a system as disclosed herein.
Figure 4:
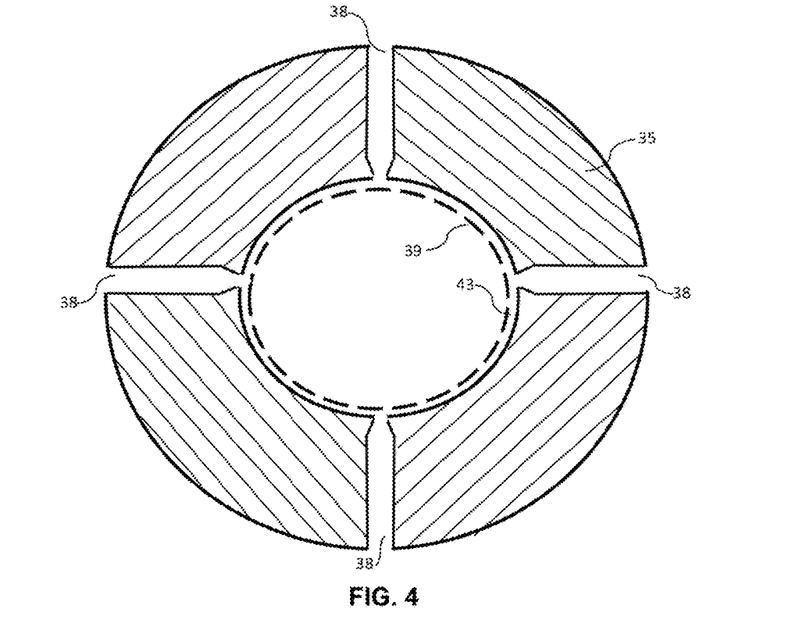
FIG. 4 illustrates another cross sectional view of a coupling as may be utilized in a system as disclosed herein.

The extension dies 33, 34 can be connected to one another and to downstream portions of the cooling section, as shown, via couplings 35. The couplings 35 can connect to the extension dies such that a gap 40 is formed between each die. The gap 40 is also illustrated in FIG. 3 and FIG. 4 in sectional views of a coupling 35 located between extension die 33 and extension die 34. As shown in FIG. 3, the gap 40 between adjacent extension dies 33, 34 includes the inner surface 39 of the coupling 35 between inner wall 44 of the extension die 33 and the inner wall 46 of extension die 34. In general, the inner wall diameter of the coupling 35 can be machined to match the inner wall diameters of the extension dies 33, 34.

As the torrefied and compacted biomass 26 passes out of the compression stage 10, it can be extruded in a continual flow into the extension dies 33, 34 of the setting stage 12. Within the setting stage 12, the torrefied and densified biomass can be maintained at the high pressure and temperature of the compression stage 10. For instance, the torrefied and densified biomass 26 can be maintained at a pressure of from about 10 tons per square inch to about 30 tons per square inch and at a temperature of from about 165° C. to about 220° C., or from about 200° C. to about 220° C. in some embodiments. For instance, the extension dies 33, 34 can be wrapped with heating elements 36 (FIG. 2) to maintain the high temperature of the biomass 26.

The temperature and pressure can be maintained following compaction at the compression stage 10 and as the biomass 26 passes through the setting stage 12 for a period of time of about 20 seconds or more, for instance about 30 second or more or about 45 second or more in some embodiments. For instance, the torrefied and densified biomass 26 can be maintained at increased temperature and pressure for a period of time from about 20 seconds to about 5 minutes in some embodiments. Without wishing to be bound to any particular theory, it is believed that by holding the compacted biomass at increased temperature and pressure for a period of time during a setting stage 12 that follows compaction at the compaction stage 10, the lignin can continue to diffuse throughout the biomass, which can generate a more hydrophobic product with improved product stability.

As the densified and torrefied biomass 26 is very dry (e.g., a moisture content of about 2 wt. % or less), lubricity can be a problem in moving the biomass through the setting stage 12 and through the downstream cooling stage 14. To address this issue, low pressure (e.g., about 30 to about 70 psi) water can be injected into the flow stream of the biomass.

For instance, and as better illustrated in FIG. 3 and FIG. 4, a coupling 35 can include one or more inlets 38 via which ambient water can be fed to the biomass 26 within the setting stage 12. In the illustrated embodiment, the inlets 38 can be tapered, for instance to a hole of about 1 mm at the inner wall of the coupling 35. This is not a requirement, however, and any inlet shape is encompassed herein. In general, there can be two or more inlets for water, for instance about 3 or 4 inlets 38 placed around the wall 39 of the coupling 35 (FIG. 4).

The inlets 38 can be capable of attachment with a port 42 of a plumbing system that can feed water to the inlets 38 of the couplings 35. In one embodiment, one or more of the ports 42 can include a valve 43 that can be utilized to control flow of water to the couplings. For instance and as illustrated in FIG. 2, at least the first coupling 35 located between the first extension die 33 and the second extension die 34 immediately downstream of the compression die 20 can include a shut off valve 43. This valve can be utilized to control water flow to the contents of the system during start-up, as further described below. A shut off valve 43 can be either manually or automatically controlled, as is known in the art.

A system can generally include two or more couplings 35 can include a water flow system, for instance from two to about four couplings 35 that include the water attachment inlets 38 that can be in communication with a water system via a port 42.

As illustrated in FIG. 3 and FIG. 4, at the inlets 38, each coupling 35 can define a groove 43 that can be machined in the inner wall 39 of the coupling 35. As shown, the groove 43 can be aligned with the inlets 38 and can create a trough along the interior wall 39 of the coupling 35 that can improve the distribution of the water across the surface to the densified and torrefied biomass 26.

During startup of a process, the water flow to one or more of the inlets 38 can be controlled. In general, startup of a system can use a flow of a granular material, such as whole grain (wheat, oats, etc.). As the startup granular material exits the system in the form of a densified material, the heated torrefied material can begin to be mixed in with the startup material. Over a startup period, the amount of torrefied biomass can gradually be increased in the mix, until the startup granular material is no longer present, at which time the process can proceed in a continuous fashion.

According to a startup process, water can begin to flow to all but the first coupling 35 when the mix of grain and heated torrefied material reaches an observed mix of approximately 50%/50%. The "first" coupling 35 as utilized herein is that coupling 35 between the first extension die 33 and the second extension die 34 immediately downstream of the compression stage 10 as illustrated in FIG. 2. For instance, water can flow to all couplings 35 except the first coupling 35 by opening a main valve (not shown in the figures).

Once the granular startup material has been pulled out and the feed through the system is only the biomass material and once the temperature on the second extension die 34 has reached about 180° C. or more, water can begin to flow to the first coupling 35 between the first extension die 33 and the second extension die 34. For instance, a valve 43 on the first coupling 35 that is between extension die 33 and extension die 34 can be opened. Delay in opening the water inlets 38 at the first coupling 35 until the feed through the system is entirely torrefied biomass has been shown to improve flow through the system during startup.

Referring again to FIG. 2, downstream of the setting stage 12, the torrefied and densified biomass 26 can be extruded to a cooling stage 14, where the pressure can remain consistent with that of the compression stage 10 and the setting stage 12 (e.g., from about 10 tons per square inch to about 30 tons per square inch).

The cooling stage 14 can include a cooling system that can cool the torrefied and densified biomass 26 to a temperature below the glass transition temperature for lignin. For instance, within the cooling stage, the biomass 26 can be cooled to a temperature of from about 125° C. to about 145° C., or lower in some embodiments. For instance, in one embodiment, the biomass 26 can be cooled to ambient. The cooling stage 14 can incorporate a cooling fluid such as ethylene glycol or chilled water that can be circulated through internal and/or external tubes in contact with the extrusion tube(s) 48 that form the cooling stage 14.

During the cooling stage 14, the torrefied and densified biomass 26 can be maintained under the high pressure of the compression stage 10 and the setting stage 12, e.g., from about 10 tons per square inch to about 30 tons per square inch. Cooling the torrefied and densified biomass 26 while under pressure can improve the crystallinity of the solidifying lignin, which can improve both bulk density and water resistance of the product.

The torrefied and densified biomass product can have characteristics similar to coal, for instance similar to or better than low grade bituminous coal. For instance, the densified biomass produce can be transported by open top rail car or transport truck to a customer or port for bulk ocean shipping and eventual open top rail or truck transport to a coal fired utility or a user of coal in an industrial thermal process. Beneficially, the densified biomass product can be handled just as coal is handled; generally, sitting in large piles exposed to the elements; reclaimed to conveyance equipment to ball mills for crushing; being exposed to high heat (up to 300° C.) in crushing; and then blown as a fine powder into a coal boiler for full mid-air combustion.

The bulk density of the product can be quite high, for instance can be durable enough to maintain about 96% or more of the structure when shipped in the same manner as coal. For example, the densified biomass can have a bulk density of about 830 kilograms per cubic meter (kg/m$^3$) (about 50 pounds per cubic foot) or more. In addition, the product can have a high Hardgrove Grindability Index, for instance about 50° H or greater.

The product can also have low volatile content. For instance, it can withstand temperatures up to 270° C. without releasing greater than about 2 wt. % volatiles.

The heat content of the product can also be quite high, for instance about 20 megajoules per kilogram (MJ/kg) or greater, such as from about 20 MJ/kg to about 40 MJ/kg, or from about 25 MJ/kg to about 35 MJ/kg in some embodiments.

While certain representative embodiments and details have been shown for the purpose of illustrating the subject invention, it will be apparent to those skilled in this art that various changes and modifications may be made therein without departing from the scope of the subject invention.

What is claimed is:

1. A method for forming a dense lignocellulose biomass comprising:
   torrefying a lignocellulose biomass feedstock;
   conveying the torrefied lignocellulose biomass to a compression die, the torrefied lignocellulose biomass having a steam content of about 3 wt./v % or less at an entrance to the compression die;

densifying the torrefied lignocellulose biomass in the compression die, the densification being carried out at a pressure of from about 10 tons per square inch to about 30 tons per square inch and at a temperature of about 200° C. or greater;

maintaining the densified and torrefied lignocellulose biomass at the pressure and the temperature for a period of time of about 20 seconds or more following the densification; and cooling the densified and torrefied lignocellulose biomass at the pressure.

2. The method of claim 1, wherein the lignocellulose biomass feedstock comprises wood.

3. The method of claim 1, the feedstock comprising particles having a maximum dimension of about 3 inches or less.

4. The method of claim 1, wherein the biomass is maintained at a temperature of from about 230° C. to about 270° C. during the step of torrefying the biomass.

5. The method of claim 1, the step of torrefying comprising flowing an oxygen deprived gas through the biomass, the flow being at a rate of about 15 cubic meters per minute or less.

6. The method of claim 1, further comprising reducing the size of particles of the biomass following the step of torrefying.

7. The method of claim 6, wherein following the size reduction, the particles have a maximum dimension of about 2 inches or less and an aspect ratio of about 4 or less.

8. The method of claim 6, wherein the torrefied biomass is at a temperature of from about 140° C. to about 200° C. during the size reduction.

9. The method of claim 1, further comprising blending the torrefied biomass with a plasticizer prior to the step of densifying the torrefied lignocellulose biomass.

10. The method of claim 9, wherein the plasticizer comprises steam.

11. The method of claim 1, wherein water is injected to the densified and torrefied biomass while the biomass is maintained at the pressure and the temperature.

* * * * *